United States Patent [19]

Linden

[11] Patent Number: 5,182,357
[45] Date of Patent: Jan. 26, 1993

[54] STORAGE STABLE 100% SOLIDS HIGH ORTHO PHENOL FORMALDEHYDE HOT MELT ADHESIVES

[75] Inventor: Gary L. Linden, Centerville, Ohio
[73] Assignee: DAP, Inc., Tipp City, Ohio
[21] Appl. No.: 780,359
[22] Filed: Oct. 22, 1991
[51] Int. Cl.$^5$ .............................................. C08G 8/10
[52] U.S. Cl. .................................. 528/137; 528/129; 528/139; 528/140; 528/142; 528/143; 528/144; 528/147
[58] Field of Search ............... 528/129, 137, 139, 140, 528/142, 143, 144, 147

[56] References Cited

U.S. PATENT DOCUMENTS

| | | | |
|---|---|---|---|
| 1,931,309 | 10/1933 | Thompson | 18/59 |
| 2,079,633 | 5/1937 | Rothrock | 260/4 |
| 2,193,941 | 3/1940 | Seebach | 144/309 |
| 3,267,053 | 8/1966 | Nagle et al. | 260/17.2 |
| 3,471,443 | 10/1969 | Bornstein | 260/56 |
| 3,476,707 | 11/1969 | Culbertson et al. | 260/57 |
| 3,535,185 | 10/1970 | Tueter et al. | 156/335 |
| 4,004,061 | 1/1977 | Creighton et al. | 428/349 |
| 4,097,463 | 6/1978 | Culbertson | 260/57 |
| 4,113,542 | 9/1978 | Johansson | 156/335 |
| 4,133,796 | 1/1979 | Bullman | 260/37 |
| 4,161,576 | 7/1979 | Vasishth | 528/144 |
| 4,235,989 | 11/1980 | Leong et al. | 528/139 |
| 4,299,947 | 11/1981 | Nanjo et al. | 528/139 |
| 4,675,375 | 6/1987 | Kempter et al. | 528/140 |

FOREIGN PATENT DOCUMENTS 2277418 12/1987 Japan ................................. 528/129

OTHER PUBLICATIONS

Knop, Andre, and Pilato, Louis, *Phenolic Resins, Chemistry, Applications and Performance*, Springer-Verlag, Berlin-N.Y., 1985.
Hawley's Condensed Chemical Dictionary, 11th ed., van Nostrand Reinhold Co., New York, 1987.

*Primary Examiner*—John Kight, III
*Assistant Examiner*—Richard Lee Jones
*Attorney, Agent, or Firm*—Biebel & French

[57] ABSTRACT

One hundred percent thermosetting phenol/formaldehyde (P/F) resin and method of preparation thereof are disclosed. The resin comprises a molar ratio of F/P of about 1.2-1.7, has a softening point of about 80° C. and cures at temperature of about 140°-160° C. The method comprises heating the reactants in a solvent-less system in the presence of an ortho directing catalyst while monitoring the amount of free formaldehyde present in the reaction system.

13 Claims, No Drawings

STORAGE STABLE 100% SOLIDS HIGH ORTHO PHENOL FORMALDEHYDE HOT MELT ADHESIVES

FIELD OF THE INVENTION

This invention pertains to 100% solid hot melt adhesives comprising phenol/formaldehyde thermoset condensation resins. The resins are storage stable and may be directly heat cured without requiring additional formaldehyde for curing.

BACKGROUND OF THE INVENTION

The use of hot melt adhesives has increased greatly over the past two decades. They are used in a variety of applications, including packaging, paper laminates, nonwoven fabric impregnation, bookbinding, furniture, label, and other operations. Hot melt adhesives are advantageous because they are substantially non-polluting as compared to organically based solvent-containing systems and they do not employ water as a solvent. Water is harmful to many substrates as it can promote corrosion of ferrous surfaces and can warp wooden surfaces.

Hot melt adhesives can be thermoplastic or thermoset. If thermoplastic, they are subject to softening upon re-exposure to heat. If they are based on thermoset resins, they may give off dangerous volatile organic compounds, such as phenol or methyl ethyl ketoxime, upon curing. Moreover, many of today's available thermosets are based on expensive ingredients, such as the polyurethanes and the polyacrylates.

It is an object to provide a cost effective hot melt thermoset adhesive that will cure rapidly to bond a variety of different substrates.

It is another object to provide a storage stable hot melt thermoset that can be stored and shipped without product deterioration.

Another object is to provide a thermoset hot melt adhesive that will not give off dangerous volatiles upon curing.

PRIOR ART

A variety of phenol/formaldehyde resins and preprative methods are known. For example, U.S. Pat. No. 4,097,463 (Culbertson) discloses a process for preparing high ortho novolac resins wherein phenol/formaldehyde reactants in molar ratio of 1.2-2:1 are reacted in an organic solvent, normally xylol, under anhydrous conditions. The pH range of the reaction is controlled within the range of pH 4 to 7. The reaction is carried out at a temperature range of from about 115°-145° C. in the presence of divalent metal oxides, hydroxides, or their salts.

The products produced in accord with the '463 disclosure contain typically about 8% free phenol and the resin requires hexamethylene tetramine to cure. This latter compound gives off free formaldehyde, thereby increasing VOC emission into the atmosphere.

U.S. Pat. No. 3,267,053 produces a liquid polymer that is inappropriate for hot melt adhesive applications. The resins are prepared via condensation of between about 1-2.5 moles formaldehyde to 1 mole phenol with the reaction mixture acidified by adding a strong aqueous mineral acid, such as HCl or $H_2SO_4$ thereto. The produced liquid resin most probably contains a high free formaldehyde level and is probably not storage stable at room temperature.

A process for preparing solutions of heat-hardening unmodified phenol-formaldehyde resins is disclosed in U.S. Pat. No. 2,079,633. The reaction is conducted in the presence of a mild acid catalyst and a solvent consisting essentially of a completely volatile solvent selected from monohydric aliphatic alcohols and mononuclear aromatic hydrocarbons. The mild acid catalyst is zinc acetate, copper acetate or boric acid. The catalyst used during the reaction is not neutralized. This coupled with the fact that the product is in liquid form indicates that the product probably is not storage stable. Moreover, the liquid product contains copious quantities of solvent, raising the possibility of increased VOC emissions.

High ortho phenol-aldehyde novolac resins are produced by heating phenol and aldehyde reactants in the presence of a divalent electro-positive oxide or hydroxide or salt and a divalent electropositive metal halide or halogen atoms are taught in U.S. Pat. No. 3,476,707. Low formaldehyde/phenol ratios of from 0.5 to 0.8 are employed to avoid gelation.

Thermosetting phenol/formaldehyde resins are produced by reaction of at least one mole of formaldehyde with 1 mole of phenol in U.S. Pat. No. 4,235,989 (Leong et al). the reactants are reacted in an aqueous medium in combination with metal catalysts including zinc acetate and cobalt acetate. The invention centers around control of specific reaction parameters, such as pH, catalyst concentration, MeOH concentration, solids load in the reaction medium, and manner of $CH_2O$ feed so as to control the reaction exotherm in order that the reaction may be maintained near reflux (100° C.). The reaction produces a liquid resin with unstable, pendant hemiformal groups and with active catalyst remaining in the resin. Accordingly, the resin would not be storage stable.

A high ortho phenolic novolac resin is disclosed in U.S. Pat. No. 4,299,947 (Nanjo et al) in which a formaldehyde/phenol ratio of less than 1 is used to generate a liquid product. The reaction system employs two catalysts, needs a methylene donor to effect cure, contains from 6-7% free phenol and indicates that a high ortho resin will not be produced if the divalent metal catalyst is present at the start of the reaction.

U.S. Pat. No. 4,675,375 (Kempter et al) teaches essentially phenol-free resol ethers bonded via o'o-methylene ether groups via, inter alia, reaction of phenol/formaldehyde in molar ratio of 1:1.0 to 1:2.5 ratio in the presence of a divalent metal. The hemiformal groups are etherified with an alcohol to form a viscous liquid.

Other patents which may be of interest to the invention include U.S. Pat. Nos. 3,535,185 (Tveter et al); 3,476,707 (Culbertson); 4,004,061 (Creighton); 1,931,309 (Thompson); 4,113,542 (Johansson); 2,193,941 (Seebach); 3,471,443 (Bornstein); and 4,133,796 (Bullman).

DETAILED DESCRIPTION

In accordance with the invention, a phenolic resin is provided that comprises significant amounts of ortho methylene —$CH_2$— and ortho benzyl ether —$CH_2$—O—$CH_2$— linkages between adjacent phenol rings of the resin backbone. The resin is a 100% solids, storage stable, hot melt thermoset adhesive that is capable of curing through heating. The adhesive is suitable for bonding a variety of substrates.

Optionally, acid catalysts, such as toluene sulfonic acid, citric acid, or oxalic acid may be admixed with the resin to accelerate cure time. Microwave or radio frequency may also be used for curing.

The resin is formed from reaction of formaldehyde and phenol reactants present in the reaction mixture in a molar amount of about 1.2–1.7 moles formaldehyde to 1 mole phenol. A preferred molar range is from 1.60–1.65 moles formaldehyde:1 mole phenol. Although phenol itself can be used as a reactant, in order to increase cohesiveness of the resulting adhesive, alkylated phenols having from one to twelve carbon atoms in the alkyl group may be used. These are commercially available, with the alkyl group usually positioned either ortho or para to the OH function.

Accordingly, the phenol compound will have the structure

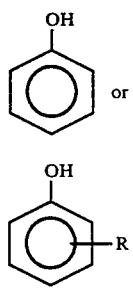

wherein R, when present, is $C_1$–$C_{12}$ alkyl.

It is preferred to run the reaction without aid of solvent. In this respect, the solid phenol reactant can be preheated to molten stage and then mixed with the formaldehyde source to facilitate the reaction. Water from the ensuing phenol-formaldehyde condensation reaction is distilled from the reaction medium as the reaction progresses. The percentage of free formaldehyde in the reaction mix is monitored, preferably by refractive index, R.I., measurement. When the R.I. approaches 1.6, the reaction is deemed complete, signifying that substantially no free formaldehyde remains in the reaction mixture.

Ortho directing catalysts, such as the well-known divalent metal salts or divalent metal oxides including the oxides formates, acetates propionates, and naphthenates of $Zn^{+2}$, $Sn^{+2}$, $Mg^{+2}$, $Pb^{+2}$, $Ba^{+2}$ or $Co^{+2}$ are used in the range of about 0.05–10 wt. % based on the weight of the phenol and formaldehyde charge. Preferably, the catalyst is selected from zinc acetate, lead naphthenate, $Pb_3O_4$ with zinc acetate being particularly preferred. Preferably, the ortho directing catalyst range is from about 0.02–2.0 wt. %. Other ortho directing catalysts, such as low levels of KOH may be mentioned. But this particular catalyst is prone to runaway exotherms and the reaction must therefore be carefully monitored.

By the phrase, "ortho directing catalysts," I mean to specify catalysts that are used to aid in the predominate formation of ortho/ortho methylene and ortho/ortho benzyl ether linkages in the phenol rings constituting the resin backbone.

As to the formaldehyde source that may be employed, solid, low molecular weight paraformaldehyde having a molecular weight of around 1,000 or less is preferred. Formalin, the well-known, commercially available aqueous solution of formaldehyde, and methanol is not preferred since pressurized reaction conditions must then be employed in order to attain the desired reaction temperature. Also, the methanol or other alkyl alcohol may form pendant alkyl ether moieties on the resin, leading to decreased softening point and cure retardation.

The desirable reaction temperature is from about 110°–125° C. and the reaction is normally run for about 1 to 6 hours or until substantially no free formaldehyde remains in the reaction medium as measured by R.I. or well-known titration techniques. When the R.I. approaches about 1.6, such as at 1.590 to 1.595, the reaction is deemed complete. The pH of the reaction system is normally in the range of about 5–7 although control of this parameter is problematic since the reaction temperature necessary for the reaction is outside of the range of most pH electrodes.

When very little formaldehyde remains in the reaction medium, the ortho directing catalyst may be separated from the reaction medium by well known techniques. Volatiles may be stripped.

In the case where zinc acetate is used as the ortho directing catalyst, the reaction mixture may be washed with dilute $H_3PO_4$ to precipitate $Zn_3(PO_4)_2$.

The resulting phenol/formaldehyde (P/F) resin is then dumped and is allowed to solidify. Typically, these resins will exhibit ring and ball softening points of about 80° C. Molecular weights of the resins are within the range of from about 500–5,000 atomic mass units. The solid resin is then ground to powder form for use as a hot melt adhesive. The P/F resin may be stored or packaged prior to usage. For desired end use, it is applied between the desired substrates and is then heated to about 150° F. to effect cure. Microwave and/or RF may be used to accelerate cure.

Although applicant is not bound to any particular theory of operation, it is thought that curing of the present P/F resin is a result of liberation of formaldehyde functional groups from the resin followed by formation of a three-dimensional network forming bridging methylene bonds located at o,p and p,p positions on phenol rings from adjacent polymer backbones. This is in contrast to certain of the prior art P/F thermoset resins that require the presence of additional formaldehyde in order to effect cure. Moreover, during curing, only harmless $H_2O$ vapor is generated, in contrast to cure processes of some other thermosets which can result in emission of dangerous compounds.

In another aspect of the invention, the powdered phenol/formaldehyde resin is admixed with from about 1 to 15 wt. % of a curing catalyst having a high melting point. The melting point of the curing catalyst is chosen so that it is above the softening point of the phenol/formaldehyde resin (i.e., above about 80° C.). The P/F resin and curing catalyst are heated at a temperature that provides for softening of the resin but not the curing catalyst. Therefore, mixing of the solid curing catalyst in the softened P/F resin at this temperature provide a homogeneous dispersion. Thereafter, the dispersion can be packaged, stably stored, and sold as a hot melt adhesive. The end user opens the package, applies the contents of the package to the desired substrate and heats the P/F resin-curing catalyst to the curing temperature, which is equal to or above the softening point temperature of the catalyst.

The curing temperature of the P/F resins in accordance with the invention is on the order of $\approx 140°$–$160°$ C., preferably 150° C. Para-toluene sulfonic acid, oxalic acid and citric acid catalyst all have softening points above the P/F resin softening point and below or equal to the P/F resin cure temperature. Accordingly, with respect to this aspect of the invention, these compounds will function to accelerate hardening of the P/F resin. Of these acids, citric acid is preferred due to its low cost and non-toxic property.

The invention will now be further described in conjunction with the following specific examples which are to be regarded as being illustrative and should not be construed to restrict the invention.

EXAMPLE ONE 1.63 moles paraformaldehyde (91-93 wt. % —CH$_2$O—) and 1.0 mole molten phenol were charged to a reactor along with 2.14 g lead naphthenate and 0.94 g litharge (P$_6$O). The materials were slowly heated over a period of 1 hour first to a temperature of about 112° C. and subsequently to about 125° C. Water was distilled from the reaction medium as the reaction progressed.

The reaction mixture was periodically sampled with the refractive index monitored to ascertain the amount of free formaldehyde remaining in the reaction mixture. When this index reached 1.5964, the reaction was deemed complete. The product was washed with a dilute H$_3$PO$_4$ wash solution with the Pb catalyst forming a precipitate. Volatiles were removed from the product at 150° C. by vacuum stripping. A clear light amber viscous resin was provided that, upon cooling, dried to a solid cross-linkable phenol-formaldehyde resin.

EXAMPLE TWO

In order to assess the bonding efficacy of the phenol-formaldehyde resin of Example One, a series of bonding tests were performed. The Example One resin was provided in powder form. In some of the tests, the P/F resins were admixed with the specified acid curing agents. The candidate adhesives were placed between two plywood substrates. The substrates were then clamped together and were then exposed to microwaves for about 1 minutes.

The following results were obtained:

| Formulation | Candidate Hot Melt Adhesive | Comments |
|---|---|---|
| 1 | 100% A | Low viscosity hot liquid; wood not bonded |
| 2 | 95% A + 5% TSA | gelled; wood successfully bonded |
| 3 | 90% A + 10% CA | gelled; wood successfully bonded |
| 4 | 95% A + 5% OA | gelled; wood successfully bonded |

A = 100% powdered resin from Example One
TSA = toluene sulfonic acid
CA = citric acid (anhydrous)
OA = oxalic acid (anhydrous)

EXAMPLE THREE

An adequate quantity of formulation #3 from Example Two was placed between two steel test panels. The panels were placed on a hot plate, heated to 150° C., and left to stand for 5 minutes under a 5 lb. weight. The resin cured to a crosslinked solid. Upon cooling, the panels could be pried apart only with difficulty. The resin seemed to be brittle upon curing, suggesting that use of an alkylated phenol, such as nonyl phenol, as the phenol reactant in the resin should be used to increase flexibility characteristics of the cured resin.

While this invention has been described with respect to particular embodiments thereof, it is apparent that numerous other forms and modifications will be obvious to those skilled in the art. The appended claims generally should be construed to cover all such obvious forms and modifications which are within the true spirit and scope of the present invention.

I claim:
1. Method of preparing a thermosetting 100 percent solids high-ortho phenol/formaldehyde resin useful as a hot melt adhesive comprising:
   (a) forming a reaction mixture comprising molten phenol and non-aqueous formaldehyde reactants present in a molar ratio of 1.2-1.7 moles of said non-aqueous formaldehyde per mole of said molten phenol, said reaction mixture being devoid of added solvent;
   (b) adding from about 0.02 to 10 wt. % of an ortho directing catalyst to said reaction mixture based on the weight of said phenol and formaldehyde;
   (c) heating said reaction mixture at a temperature of from about 110°-125° C. until substantially no free formaldehyde remains in said reaction mixture and wherein the refractive index approaches about 1.6";
   (d) allowing said reaction mixture to cool, thus forming a solid storage stable thermosetting phenol/formaldehyde resin having a molecular weight of between about 500 and 5,000 atomic mass units.

2. Method as recited in claim 1 further comprising continuously removing water from said reaction mixture formed from said reaction during said heating step (c).

3. Method as recited in claim 2 wherein said formaldehyde:phenol molar ratio is about 1.60-1.65.

4. Method as recited in claim 2 wherein said phenol comprises a $C_1$-$C_{12}$ alkyl phenol.

5. Method as recited in claim 4 wherein said $C_1$-$C_{12}$ alkyl phenol comprises $C_1$-$C_{12}$ o or $C_1$-$C_{12}$ p alkyl phenol.

6. Method as recited in claim 2 wherein said ortho directing catalyst comprises a divalent metal salt or divalent metal oxide.

7. Method as recited in claim 6 wherein said ortho directing catalyst comprises zinc acetate.

8. Method as recited in claim 6 wherein said ortho directing catalyst comprises P$_6$O and lead naphthenate.

9. Method as recited in claim 1 further comprising precipitating said ortho directing catalyst from said reaction mixture prior to said step (d).

10. Method as recited in claim 1 further comprising adding to said phenol/formaldehyde resin formed in step (d) from 1 to 15 wt. % of a curing catalyst having a softening point higher than the softening point of said phenol/formaldehyde resin to form a storage stable resin-curing catalyst mixture.

11. Method as recited in claim 10 further comprising heating said storage-stable resin-curing catalyst mixture to about 140°-160° C. to effect cure of said phenol/formaldehyde resin.

12. Method as recited in claim 11 wherein said curing catalyst comprises p-toluene sulfonic acid, oxalic acid, or citric acid.

13. Method as recited in claim 12 wherein said curing catalyst comprises citric acid.

* * * * *

UNITED STATES PATENT AND TRADEMARK OFFICE
CERTIFICATE OF CORRECTION

PATENT NO. : 5,182,357

DATED : January 26, 1993

INVENTOR(S) : Gary L. Linden

It is certified that error appears in the above-identified patent and that said Letters Patent is hereby corrected as shown below:

<u>Col. 6</u>

Claim 1, line 27, delete --"--.

<u>Col. 6</u>

Claim 8, line 49, "$P_6O$" should be --$PbO$--.

Signed and Sealed this

Second Day of November, 1993

*Attest:*

BRUCE LEHMAN

*Attesting Officer*    Commissioner of Patents and Trademarks